Patented Feb. 29, 1944

2,343,091

UNITED STATES PATENT OFFICE 2,343,091

TREATMENT OF TEXTILES AND COMPOSITION USEFUL THEREFOR

Joseph Edward Smith, Wilmington, Del., assignor to E. I. du Pont de Nemours & Company, Wilmington, Del., a corporation of Delaware No Drawing. Application August 3, 1940, Serial No. 351,085

14 Claims. (Cl. 260—27)

This invention relates to mixed resins prepared by dissolving resinous materials in monomeric liquids capable of polymerization and polymerizing, and more particularly to resins prepared by dissolving resins in monomeric methacrylic acid esters or vinyl alcohol esters and polymerizing, and still more particularly to dispersions of the above resins.

This invention has as an object the preparation of mixed polymers of resins and polymerizable liquids. A further object is the preparation of mixed polymers of methacrylic acid esters and vinyl alcohol esters with resins soluble in the ester monomer. A still further object is the preparation of stable dispersions of mixed polymers of methacrylic acid esters and vinyl alcohol esters with resins soluble in the methacrylic acid ester monomer and vinyl alcohol ester monomer. Other objects will appear hereinafter.

These objects are accomplished by the following procedure. A partially or fully polymerized resin polymer selected from either natural or synthetic resins and soluble in a methacrylic acid ester or vinyl alcohol ester monomer is dissolved together with a small amount of benzoyl peroxide in the ester monomer. The solution of the resin components is agitated vigorously with a solution in water of a partially saponified polyvinyl acetate.

The emulsion obtained is heated to produce polymerization in the resin phase. The dispersions of mixed resin polymers or of resin interpolymers obtained are stable to storage and are valuable for sizing textiles.

Dispersions of polymers of methacrylic acid or vinyl alcohol esters produce a desirable bodying effect in the sizing of textile fabrics. The dispersions may be produced using long chain surface active agents or protective colloids to maintain the stability of the dispersions. The finishes are characterized by a desirable durability to laundering procedures and are much less affected by laundering than are finishes from starches, gelatin, and gums. However, the methacrylic acid or vinyl alcohol ester polymers are relatively expensive for use compared with starches, gums and many other resins. It has been found that a large number of natural and synthetic resins are highly soluble in methacrylic acid and vinyl alcohol ester monomers and that valuable mixed polymers or interpolymers are obtained on polymerizing an ester monomer containing in solution a resinous material. Examples of resinous materials that are soluble in methacrylic acid or vinyl alcohol ester monomers are rosin, ester gum (a glyceryl ester of abietic acid), pinene-phenol resin, phenol-formaldehyde resins, alkyd resins, and cumarone-indene resins. These cheaper resinous materials are in many instances either highly colored or subject to discoloration by sunlight and by elevated temperatures so that they are generally unsuitable for finishing textiles. They are, as a rule, less fast to laundering than the methacrylic acid ester polymers or vinyl alcohol ester polymers on textile fabrics. It has been discovered that the interpolymers or mixed polymers of these resins with methacrylic acid or vinyl alcohol ester derivatives are practically colorless and are quite resistant to discoloration on exposure to light or heat. The interpolymers or mixed polymers are as fast to laundering as the methacrylate or vinyl ester resins alone. The sizing effects obtained on textile fabrics with the mixed polymers or interpolymers are in general equal if not superior to those obtained from the ester polymers alone; added advantages are found in obtaining slip resistance in fabrics and in reducing the tendency to snag inherent in sheer silk hosiery and in nylon hosiery. It is evident that the valuable features of the individual components in the mixed polymers or interpolymers of the above described resinous materials are retained while many of the undesirable features of individual components are reduced or eliminated. The dispersions of the described interpolymers or mixed polymers are cheaper to prepare than similar dispersions of methacrylic acid or vinyl alcohol ester derivatives alone.

In carrying out the invention, an aqueous solution of a partially saponified polyvinyl acetate containing, in addition, a small amount of technical dodecyl diethylcyclohexylamine sulfate is agitated vigorously with a monomeric methacrylic acid or vinyl alcohol ester containing in solution a substantial proportion of a soluble resin and a small amount of benzoyl peroxide. The emulsion is heated to a temperature above 55° C. and preferably above 65° C. to induce polymerization of the ester monomer.

The preferred saponified polyvinyl acetate for use in preparing emulsions containing a substantial amount of a methacrylate ester has a saponification number of 100–120 and gives a viscosity for a 4% aqueous solution at 20° C. of 20 centipoises. The preferred saponified polyvinyl acetate for use in preparing emulsions containing substantial amounts of vinyl acetate has a saponification number of 135–180 and gives a viscosity for a 4% aqueous solution at 20° C. of 40 centipoises. The concentration of partially saponified polyvinyl acetate in the dispersion should be at least 0.75% and should not be more than 5% owing to the viscosity in solution. The resin dispersions produced are sufficiently stable to storage for commercial distribution.

The following examples are illustrative of the invention but are not intended as limiting it in any way. All parts are given by weight except where it may be otherwise indicated.

Example 1

Ten parts of a glyceryl ester of abietic acid and 0.2 part of benzoyl peroxide were dissolved in 10 parts of methyl methacrylate monomer. The resulting solution was dispersed in 79.8 parts of an aqueous solution containing 2 parts of partially saponified polyvinyl acetate and 0.02 part of technical dodecyl diethylcyclohexylamine sulfate by high-speed stirring. The saponification number of the polyvinyl acetate was 110 and the viscosity of a 4% aqueous solution at 20° C. was 20 centipoises. The emulsion was heated for 4 hours at 67° C. to cause polymerization. A stable dispersion of a resinous polymer was obtained.

Two grams of the emulsion were spread on a glass plate and the water removed by drying at 100° C. A transparent, colorless, non-tacky film was deposited on the glass.

Example 2

Ten parts of the product from Example 1 were dispersed with 90 parts of water. A nylon stocking was impregnated with the emulsion to obtain 100% increase in weight. The stocking was dried on a hosiery form at 100° C. The treated stocking, compared with an untreated stocking, had an attractive silk-like hand, added body, markedly improved snag resistance and decreased luster. The finish on the stocking was practically unchanged after washing at 120° F. for 30 minutes in a 0.5% soap solution.

Example 3

Ten parts of the product from Example 1 were dispersed in 90 parts of water. A silk stocking was impregnated with the emulsion to obtain 100% increase in weight. The stocking was dried on a hosiery form at 100° C. The treatment added considerable body to the silk and produced a well delustered stocking with improved snag resistance. The finish on the stocking was practically unchanged after washing for 30 minutes at 120° F. in a 0.5% soap solution.

Example 4

Five parts of the product from Example 1 were dispersed with 95 parts of water. A strip of viscose process rayon crepe was impregnated with the dispersion to obtain 100% increase in weight. The treated goods were dried at 220° F. The viscose process rayon fabric was markedly delustered and considerable body was added to it. Threads in the treated fabric had much less tendency to slip. The greater part of the finish remained on the fabric after washing for 30 minutes at 120° F. in a 0.5% soap solution.

Example 5

Ten parts of methyl methacrylate monomer, in which 0.2 part of benzoyl peroxide, 4 parts of di(methylcyclohexyl) adipate and 7 parts of a glyceryl ester of abietic acid were dissolved, was emulsified in water containing 2 parts of partially saponified polyvinyl acetate and 0.02 part of technical dodecyl diethylcyclohexylamine sulfate, and polymerized as in Example 1. A stable resin dispersion was obtained.

The product applied, as in Example 2, to a nylon stocking produced an attractive silk-like hand, added body, markedly improved snag resistance and considerable delustering.

The product applied, as in Example 3, to a silk stocking produced added body, improved snag resistance and appreciable delustering.

The product applied, as in Example 4, to viscose process rayon crepe fabric added noticeable body and considerable dullness. The threads of the treated fabric had much less tendency to slip.

The fastness of the product to laundering on silk, nylon and viscose process rayon was equivalent to that described in Examples 2, 3 and 4.

Example 6

Ten parts of a glyceryl ester of abietic acid and 0.2 part of benzyl peroxide dissolved in 10 parts of normal butyl methacrylate monomer were emulsified in 79.8 parts of an aqueous solution containing 2 parts of partially saponified polyvinyl acetate, of saponification number 110, and 0.02 part of technical dodecyl diethylcyclohexylamine sulfate, by means of a high-speed mixer. The emulsion was polymerized as in Example 1.

The polymerization product applied as in Example 2 to a nylon stocking added considerable body and markedly improved the snag resistance.

The polymerization product applied as in Example 3 to a silk stocking added considerable body and markedly improved the snag resistance of the hose.

The polymerization product applied as in Example 4 to a viscose process rayon crepe fabric added considerable fullness and stiffness to the fabric. Threads of the treated fabric had much less tendency to slip.

The fastness of the product to laundering on silk, nylon and viscose process rayon was equivalent to that described in Examples 2, 3 and 4.

Example 7

Ten parts of a glyceryl ester of abietic acid and 0.2 part of benzoyl peroxide were dissolved in 10 parts of isobutyl methacrylate monomer and emulsified in water with 79.8 parts of an aqueous solution containing 2 parts of a partially saponified polyvinyl acetate of saponification number 110, and 0.02 part of technical dodecyl diethylcyclohexylamine sulfate, by means of a high-speed mixer. The emulsion was polymerized as in Example 1.

The polymerization product applied, as in Example 2, to a nylon stocking added considerable body and markedly improved the snag resistance of the stocking. Similar results were obtained on a silk stocking.

The polymerization product applied, as in Example 4, to a viscose process rayon crepe fabric added considerable fullness and stiffness and threads of the treated fabric had much less tendency to slip.

Ten parts of the polymerized dispersion were dispersed with 90 parts of water. A strip of a cotton gabardine fabric was impregnated with the dispersion to obtain 100% increase in weight. The treated goods were dried at 220° F. Considerable body and fullness were added to the gabardine fabric.

Example 8

Di(butoxyl ethyl) phthalate was substituted for di-(methylcyclohexyl) adipate in Example 5. A similar product was obtained.

Example 9

Butyl phthalyl butyl glycollate was substituted for the di(methylcyclohexyl) adipate of Example 5. A similar product was obtained.

Example 10

Ten parts of a pinene-phenol condensation product and 0.2 part of benzoyl peroxide were dissolved in ten parts of methyl methacrylate monomer and emulsified in 79.8 parts of an aqueous solution containing 2 parts of partially saponified polyvinyl acetate (saponification number 110) and 0.02 part of technical dodecyl diethylcyclohexylamine sulfate and polymerized as in Example 1. The dispersion obtained was stable to storage.

Two grams of the dispersion were spread on a glass plate and the water removed by drying at 100° C. A transparent, colorless, non-tacky film was deposited on the glass.

The polymerization product was applied to nylon, silk and viscose process rayon by the methods used in Examples 2, 3 and 4, respectively, to obtain results similar to those obtained with the polymer made from methyl methacrylate and a glyceryl ester of abietic acid described in Example 1.

Example 11

Normal butyl methacrylate was substituted for the methyl methacrylate in Example 10.

The polymerization product was applied as in Example 6 to obtain results similar to those obtained with the polymer made from normal butyl methacrylate and a glyceryl ester of abietic acid.

Example 12

Ten parts of a phenol formaldehyde resin and 0.2 part of benzoyl peroxide were dissolved in ten parts of methyl methacrylate monomer and emulsified in 79.8 parts of an aqueous solution containing 2 parts of partially saponified polyvinyl acetate (saponification number 110) and 0.02 part of technical dodecyl diethylcyclohexylamine sulfate. The emulsion was polymerized as in Example 1. The resin dispersion obtained was stable to storage.

The polymerization product was applied to nylon, silk and viscose process rayon as indicated in Examples 2, 3 and 4 to obtain results similar to those obtained with the polymer obtained from methyl methacrylate and a glyceryl ester of abietic acid.

Example 13

Normal butyl methacrylate monomer was substituted for the methyl methacrylate monomer in Example 12 to obtain a stable dispersion. The polymerization product was applied as in Example 6 to obtain results similar to those obtained with a polymer made from normal butyl methacrylate and a glyceryl ester of abietic acid.

Example 14

Ten parts of a cumarone-indene type resin and 0.2 part of benzoyl peroxide were dissolved in 10 parts of methyl methacrylate monomer and emulsified in 79.8 parts of an aqueous solution containing 2 parts of partially saponified polyvinyl acetate (saponification number 110) and 0.02 part of technical dodecyl diethylcyclohexylamine sulfate. The emulsion was polymerized as in Example 1. The resin dispersion was stable to storage.

The polymerization product was applied to nylon, silk and viscose process rayon by the methods used in Examples 2, 3 and 4. Snag resistant finishes were obtained on nylon and silk hosiery, while improved resistance to slippage was obtained on the viscose process rayon fabric. The finishes were characterized by fullness, flexibility and softness. The finishes were resistant to laundering.

Example 15

Normal butyl methacrylate monomer was substituted for the methyl methacrylate monomer in Example 14 to obtain a stable dispersion. The polymerization product was applied to nylon, silk and viscose process rayon as in Example 14. Snag resistant finishes and improved resistance to slippage was obtained. The finishes were resistant to laundering.

Example 16

Ten parts of a modified alkyd resin and 0.2 part of benzoyl peroxide were dissolved in 10 parts of methyl methacrylate monomer and the resulting solution was emulsified in 79.8 parts of water containing 2 parts of partially saponified polyvinyl acetate (saponification number 110) and 0.02 part of technical dodecyl diethylcyclohexylamine sulfate.

The emulsion was poylmerized as in Example 1 to obtain a stable resin dispersion. The polymerization product was applied to nylon, silk and viscose process rayon by methods used in Examples 2, 3 and 4. Snag resistant finishes were obtained on nylon and silk hosiery while a slip resistant finish was obtained on the viscose process rayon crepe. The finishes were characterized by increased dullness, fullness and noticeable stiffness in the fabrics. The finishes were resistant to laundering.

Example 17

Normal butyl methacrylate was substituted for methyl methacrylate in Example 16 to obtain a stable dispersion. The polymerization product was applied to nylon, silk and viscose process rayon, as in Example 16, to obtain improved snag resistance and slip resistance. The finishes were characterized by increased fullness and appreciable stiffness in the fabric. The finishes were resistant to laundering.

Example 18

Five parts of n-butyl methacrylate monomer and 5 parts of methyl methacrylate monomer were substituted for the 10 parts of methyl methacrylate monomer in Example 1. A stable resin dispersion was obtained.

The polymerization product was applied to nylon, silk and viscose process rayon by the methods used in Examples 2, 3 and 4. The finishes obtained were characterized by fullness and crispness. Snag resistant finishes were obtained on nylon and silk hosiery while a slip resistant finish was obtained on the viscose process rayon crepe. The finishes were resistant to laundering.

Example 19

8.25 parts of the hydrogenated glyceryl ester of abietic acid and 0.25 part of benzoyl peroxide were dissolved in 16.5 parts of vinyl acetate monomer. The solution was emulsified by stirring with 75 parts of an aqueous solution containing 2.5 parts of partially saponified polyvinyl acetate and 0.025 part of technical dodecyl diethylclycohexylamine sulfate. The partially saponified polyvinyl acetate which was used had a saponification number of 180 and gave a viscosity in a 4% aqueous solution of 40 centipoises at 20° C. The emulsion was aged for four hours at 67° C. to produce a stable dispersion of a resinous polymer.

The product was applied to cotton gabardine as in Example 7. A full, leathery hand was obtained on the fabric. The finish was resistant to laundering.

*Example 20*

Five parts of the product from Example 6 and 0.2 part of technical cetyl sodium sulfate, an anionic surface active agent, were dispersed in 94.8 parts of water at 100° F. The dispersion was padded onto cotton broadcloth to obtain a 100% increase in weight. The treated fabric was air-dried at 230° F. on a frame. The dried fabric had a full, stiff hand with considerable surface lubrication. The dispersion was entirely stable during application.

*Example 21*

Stearyl trimethyl ammonium bromide, a cationic surface active agent, was substituted for cetyl sodium sulfate in Example 20. The dispersion was entirely stable during application. The dried fabric had a full, stiff hand with a smooth surface.

*Example 22*

Two grams of the dispersion prepared in Example 6 were dispersed in 97.5 grams of water with 0.5 gram of a negatively charged aqueous emulsion of a mineral oil of the following composition:

| | Parts |
|---|---|
| A mineral oil of 300–310 S. U. V. at 100° F | 20 |
| Technical octadecyl diethylcyclohexylamine sulfate | 14.4 |
| Technical octadecenyl alcohol | 2.0 |
| Triethylene glycol | 4.0 |
| n-Butanol | 2.0 |
| Water | 57.6 |

A strip of cotton broadcloth was passed through the liquid at 100° F. and run between squeeze rolls to obtain a 100% increase in weight. The fabric was air dried on a frame at 240° F. A sized fabric was obtained which was characterized by fullness, firmness and considerable surface lubrication. The dispersions were entirely stable during application.

*Example 23*

Two and a half parts of the resin dispersion from Example 6 were dispersed in 95 parts of water along with 2.5 parts of composition A, a positively charged wax dispersion. Composition A is:

| | Per cent |
|---|---|
| Refined paraffin wax | 16.7 |
| Acetate of deacetylated chitin | 1.3 |
| Basic aluminum acetate | 3.0 |
| Acetic acid | 0.5 |
| Technical dodecyl diethylcyclohexylamine sulfate | 0.09 |
| Water | 78.41 |

A strip of cotton broadcloth was passed through the dispersion at 100° F. and run between squeeze rolls to obtain a 100% increase in weight. The fabric was dried on a mangle at 250° F. A sized fabric was obtained which was characterized by softness, fullness, and excellent water repellency. The water repellent effect obtained was more durable to laundering than that obtained from the application of composition A alone. The dispersion was entirely stable during application.

Other vinylidine compounds may be used to replace the methacrylate derivatives and the vinyl acetate used in this invention. For example, butadiene and its derivatives, styrene, vinyl esters, acrylates, acrylamides, methacrylamides, acrylonitriles, and methacrylonitriles may be used alone or as mixed solvents for the resins. The resins to be dissolved in the monomers may include rosin and its derivatives, dammar gums, alkyd and modified alkyd resins, phenol-formaldehyde and modified phenol-formaldehyde resins, and cumarone-indene resins.

Other plasticizers than di(methylcyclohexyl) adipate, di(butoxy ethyl) phthalate, and butyl phthalyl butyl glycollate may be used. Suitable plasticizers are described by Strain, Kennelly, and Dittmar, in Industrial and Engineering Chemistry, 31, 382 (1939).

The technical dodecyl diethylcyclohexylamine sulfate may be omitted or may be substituted by any other wetting agent which has pronounced surface active properties in aqueous solution.

Other substantially non-polar, high molecular weight water soluble protective colloids may be used in place of partially saponified polyvinyl acetate. In place of partially saponified polyvinyl acetate there may be used cellulose derivatives such as water soluble methyl cellulose, the ethylene oxide reaction product of oleyl alcohol.

Compositions described in this invention are useful as sizes for general use in the textile field and on paper. The compositions produce slip resistant finishes on textiles and increase the wet strength of paper. They may be used to produce durable wash-resistant starch-like finishes on textiles. The finishes may be used in sizing textiles alone or as binders for fillers as starch, dextrin, gums, talc, clay, etc. The finishes are valuable for producing snag-resistant and slip-resistant effects on nylon and silk piece goods, knitted goods and hosiery.

The invention describes methods for making solvent-free, stable resin dispersions capable of being used economically to produce durable, wash-resistant, starch-like finishes on textiles. The technique involved makes it possible to utilize inexpensive resins, ordinarily considered unsatisfactory for textile sizing, by incorporating them in substantial proportions with the relatively more expensive vinylidene derivatives. The interpolymers and mixed polymers obtained are in many instances more effective as stiffening agents than are the vinylidene derivatives alone. The mixed polymers are equal to, and in many cases superior to, the vinyl resins in resistance to laundering, heat, and light. The mixed polymers are not only effective sizing agents but are also valuable for producing slip-resistant and snag-resistant finishes on piece goods, knit fabrics, and hosiery.

The resin dispersions described herein are compatible with a wide variety of both anionic and cationic surface active agents and finishing agents as well as with both positively and negatively charged emulsions and dispersions. These resin dispersions are also compatible with a wide number of water soluble multivalent and heavy metal salts which may be present in textile processing baths as, for example, water soluble salts of calcium, magnesium, tin, lead, cobalt, nickel, iron, chromium and manganese.

In this specification the term nylon is employed as a generic term covering the synthetic fiber-forming linear polyamides having a protein-like structure and which are the reaction products of linear polymer-forming materials of the group consisting of (a) monoaminomono-carboxylic acids and (b) mixtures of diamines with dibasic carboxylic acids, as more particularly described in United States Patents 2,071,250, 2,071,253, 2,130,523 and 2,130,498.

The subjoined claims are intended to cover not only the products described herein but to generically cover certain products which are described and specifically claimed in my copending applications, Serial Numbers 351,086 and 351,087, filed on this same day, to which reference may be made for further disclosure. The resin dispersions described and specifically claimed in the aforesaid copending applications contain other ingredients, in addition to those specified in the subjoined claims, which impart substantivity for fabrics to the resin dispersions described and claimed in these copending applications.

The above description and examples are intended to be illustrative only and not to limit the scope of the invention. Any departure therefrom which conforms to the spirit of the invention is intended to be included within the scope of the appended claims.

I claim:

1. A textile finishing composition adapted for sizing and finishing textile fibers comprising a stable aqueous dispersion of a polymerized vinylidene compound containing intimately incorporated in said polymer a resin which does not contain the vinylidene group, said composition containing as the dispersing agent a non-polar high molecular weight water soluble protective colloid of the class consisting of partially saponified polyvinyl esters, water soluble methyl celluloses and the ethylene oxide reaction product of oleyl alcohol.

2. A textile finishing composition adapted for sizing and finishing textile fibers comprising a stable aqueous dispersion of a polymerized vinyl acetate containing intimately incorporated in said polymer a resin which does not contain the vinylidene group, said composition containing as the dispersing agent a non-polar high molecular weight water soluble protective colloid of the class consisting of partially saponified polyvinyl esters, water soluble methyl celluloses and the ethylene oxide reaction product of oleyl alcohol.

3. A textile finishing composition adapted for sizing and finishing textile fibers comprising a stable aqueous dispersion of a polymerized alkyl methacrylate containing intimately incorporated in said polymer a resin which does not contain the vinylidene group, said composition containing as the dispersing agent a non-polar high molecular weight water soluble protective colloid of the class consisting of partially saponified polyvinyl esters, water soluble methyl celluloses and the ethylene oxide reaction product of oleyl alcohol.

4. A textile finishing composition adapted for sizing and finishing textile fibers comprising a stable aqueous dispersion of a polymerized n-butyl methacrylate containing intimately incorporated in said polymer a resin which does not contain the vinylidene group, said composition containing as the dispersing agent a water soluble partially saponified polyvinyl acetate.

5. A textile finishing composition adapted for sizing and finishing textile fibers comprising a stable aqueous dispersion of a polymerized methyl methacrylate containing intimately incorporated in said polymer a resin which does not contain the vinylidene group, said composition containing as the dispersing agent a water soluble partially saponified polyvinyl acetate.

6. A textile finishing composition adapted for sizing and finishing textile fibers comprising a stable aqueous dispersion of a polymerized vinyl acetate containing intimately incorporated in said polymer a resin which does not contain the vinylidene group, said composition containing as the dispersing agent a water soluble partially saponified polyvinyl acetate.

7. A textile finishing composition adapted for sizing and finishing textile fibers comprising a stable aqueous dispersion of a polymerized vinylidene compound containing intimately incorporated in said polymer an ester gum, said composition containing as the dispersing agent a water soluble partially saponified polyvinyl acetate.

8. A textile finishing composition adapted for sizing and finishing textile fibers comprising a stable aqueous dispersion of a polymerized vinyl acetate containing intimately incorporated in said polymer an ester gum, said composition containing as the dispersing agent a water soluble partially saponified polyvinyl acetate.

9. A textile finishing composition adapted for sizing and finishing textile fibers comprising a stable aqueous dispersion of a polymerized alkyl methacrylate containing intimately incorporated in said polymer an ester gum, said composition containing as the dispersing agent a water soluble partially saponified polyvinyl acetate.

10. A textile finishing composition adapted for sizing and finishing textile fibers comprising a stable aqueous dispersion of a polymerized n-butyl methacrylate containing intimately incorporated in said polymer an ester gum, said composition containing as the dispersing agent a water soluble partially saponified polyvinyl acetate.

11. A textile finishing composition adapted for sizing and finishing textile fibers comprising a stable aqueous dispersion of a polymerized methyl methacrylate containing intimately incorporated in said polymer an ester gum, said composition containing as the dispersing agent a water soluble partially saponified polyvinyl acetate.

12. A slip-resistant fabric consisting of a synthetic fiber-forming linear polyamide having a protein-like structure and which is the reaction product of a linear polymer-forming material of the group consisting of (a) monoaminomono-carboxylic acid and (b) mixtures of diamines with dibasic carboxylic acid which has been rendered slip-resistant with a finishing composition comprising a water insoluble polymerized vinyl acetate containing incorporated therein a resin which does not contain the vinylidene group.

13. A slip-resisting fabric consisting of a synthetic fiber-forming linear polyamide having a protein-like structure and which is the reaction product of a linear polymer-forming material of the group consisting of (a) monoaminomono-carboxylic acid and (b) mixtures of diamines with dibasic carboxylic acid which has been rendered slip-resistant with a finishing composition comprising a water insoluble polymerized methyl methacrylate containing incorporated therein an ester gum.

14. A slip-resistant fabric consisting of a synthetic fiber-forming linear polyamide having a protein-like structure and which is the reaction product of a linear polymer-forming material of the group consisting of (a) monoaminomonocarboxylic acid and (b) mixtures of diamines with dibasic carboxylic acid which has been rendered slip-resistant with a finishing composition comprising a water insoluble polymerized vinyl acetate containing incorporated therein an ester gum.

JOSEPH EDWARD SMITH.